United States Patent
Higa

(10) Patent No.: US 11,403,843 B2
(45) Date of Patent: Aug. 2, 2022

(54) IMAGE PROCESSING APPARATUS, DISPLAY CONTROL APPARATUS, IMAGE PROCESSING METHOD AND RECORDING MEDIUM

(71) Applicant: NEC Corporation, Tokyo (JP)

(72) Inventor: Kyota Higa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 49 days.

(21) Appl. No.: 16/570,809

(22) Filed: Sep. 13, 2019

(65) Prior Publication Data

US 2020/0082193 A1   Mar. 12, 2020

Related U.S. Application Data

(63) Continuation of application No. 15/521,277, filed as application No. PCT/JP2015/005151 on Oct. 9, 2015, now Pat. No. 10,438,079.

(30) Foreign Application Priority Data

Oct. 23, 2014   (JP) .................................. 2014-216117

(51) Int. Cl.
  *G06K 9/62*   (2022.01)
  *A47F 10/02*  (2006.01)
  (Continued)

(52) U.S. Cl.
  CPC .............. *G06V 10/98* (2022.01); *A47F 10/02* (2013.01); *B65G 1/137* (2013.01); *G06K 9/62* (2013.01);
  (Continued)

(58) Field of Classification Search
  CPC ... G06K 9/03; G06K 9/62; G06K 9/78; A47F 10/02; A47F 2010/025; B65G 1/137; G06Q 10/087; G06Q 30/02; G06Q 30/06
  See application file for complete search history.

(56) References Cited

U.S. PATENT DOCUMENTS 7,246,078 B2   7/2007 Vincent
8,873,794 B2 *  10/2014 Sorensen ............. G06Q 10/087
                                              382/100
(Continued)

FOREIGN PATENT DOCUMENTS

CN   102930264 A   2/2013
CN   103150540 A   6/2013
(Continued)

OTHER PUBLICATIONS

Office Action dated Feb. 19, 2020, issued by the Chinese Patent Office in counterpart Chinese Patent Application No. 2015800576042.
(Continued)

*Primary Examiner* — Shefali D Goradia

(57) ABSTRACT

The present invention provides a function capable of detecting, with a higher degree of precision, a region that has a high probability of not having been recognized. An image processing apparatus according to the present invention is provided with: a recognition means for recognizing a product from a captured image obtained by capturing an image of a displayed product; and a detection means for detecting a region of a product that is included in the captured image but is not recognized by the recognition means, on the basis of furniture information related to furniture in which the product is displayed.

10 Claims, 10 Drawing Sheets

(51) Int. Cl.

| | |
|---|---|
| *G06V 10/98* | (2022.01) |
| *B65G 1/137* | (2006.01) |
| *G06Q 30/02* | (2012.01) |
| *G06Q 30/06* | (2012.01) |
| *G06V 10/10* | (2022.01) |
| *G06Q 10/08* | (2012.01) |

(52) U.S. Cl.
CPC ........... *G06Q 10/087* (2013.01); *G06Q 30/02* (2013.01); *G06Q 30/06* (2013.01); *G06V 10/10* (2022.01); *A47F 2010/025* (2013.01)

(56) References Cited

U.S. PATENT DOCUMENTS

| | | | | |
|---|---|---|---|---|
| 9,886,678 | B2* | 2/2018 | Yan | ............. G06F 3/147 |
| 2006/0283941 | A1* | 12/2006 | Singer-Harter | ........ G06Q 30/02 |
| | | | | 235/383 |
| 2008/0043013 | A1 | 2/2008 | Gruttadauria et al. | |
| 2009/0063307 | A1 | 3/2009 | Groenovelt et al. | |
| 2011/0011936 | A1 | 1/2011 | Morandi et al. | |
| 2011/0143779 | A1 | 6/2011 | Rowe et al. | |
| 2011/0249867 | A1 | 10/2011 | Haas et al. | |
| 2011/0299770 | A1 | 12/2011 | Vaddadi et al. | |
| 2012/0265744 | A1 | 10/2012 | Berkowitz et al. | |
| 2012/0323620 | A1 | 12/2012 | Hofman et al. | |
| 2014/0003729 | A1 | 1/2014 | Auclair et al. | |
| 2014/0129395 | A1 | 5/2014 | Groenovelt et al. | |
| 2014/0195302 | A1 | 7/2014 | Yopp et al. | |
| 2017/0178060 | A1* | 6/2017 | Schwartz | ............. G06K 9/6267 |

FOREIGN PATENT DOCUMENTS

| | | |
|---|---|---|
| JP | 2007-21007 | 2/2007 |
| JP | 2009-265998 | 11/2009 |
| JP | 2012-126532 | 7/2012 |
| JP | 2012-193873 | * 10/2012 |
| JP | 2013-250647 | 12/2013 |
| JP | 2014-170431 | 9/2014 |
| WO | WO 2014/136559 A1 | 9/2014 |

OTHER PUBLICATIONS

Hong, "The Value of Automatic Identification Technology in Retail", Mar. 31, 2005.

Cao Huai et al., "Product Identity Strategy Research on Equipment Manufacturing Industry", Dept. of Industrial Design, Huazhong University of Science and Technology, Wuhan, Hubai Provence, China.

Notification to Grant Patent Right for Invention dated Sep. 10, 2020, issued by the Chinese Patent Office in counterpart Chinese Patent Application No. 20150057604.2.

Search Report dated Sep. 10, 2020, issued by the Chinese Patent Office in counterpart Chinese Patent Application No. 201580057604.2.

International Search Report dated Nov. 24, 2015, in corresponding PCT International Application.

Extended European Search report dated Mar. 16, 2018, in corresponding PCT International Application No. 15852272.2.

Marian George et al.: "Recognizing Products: A Per-exemplar Multi-label Image Classification Approach" ECCV 2016 conference, Sep. 12, 2014, Springer International Publishing, vol. 8690, pp. 440-455.

* cited by examiner

Fig. 4

SNACK A, 0.80, x1, y1, x2, y2, x3, y3, x4, y4
CHOCOLATE B, 0.72, x'1, y'1, x'2, y'2, x'3, y'3, x'4, y'4
...

RECOGNITION RESULT (PRODUCT NAME,
RECOGNITION SCORE, POSITIONAL INFORMATION)

Fig. 5

PRODUCT RECOGNITION FAILURE, x1, y1, x2, y2, x3, y3, x4, y4
FALSE RECOGNITION, x'1, y'1, x'2, y'2, x'3, y'3, x'4, y'4
...

DETECTION RESULT (FAILURE TO RECOGNIZE PRODUCT OR
FALSE RECOGNITION, POSITIONAL INFORMATION)

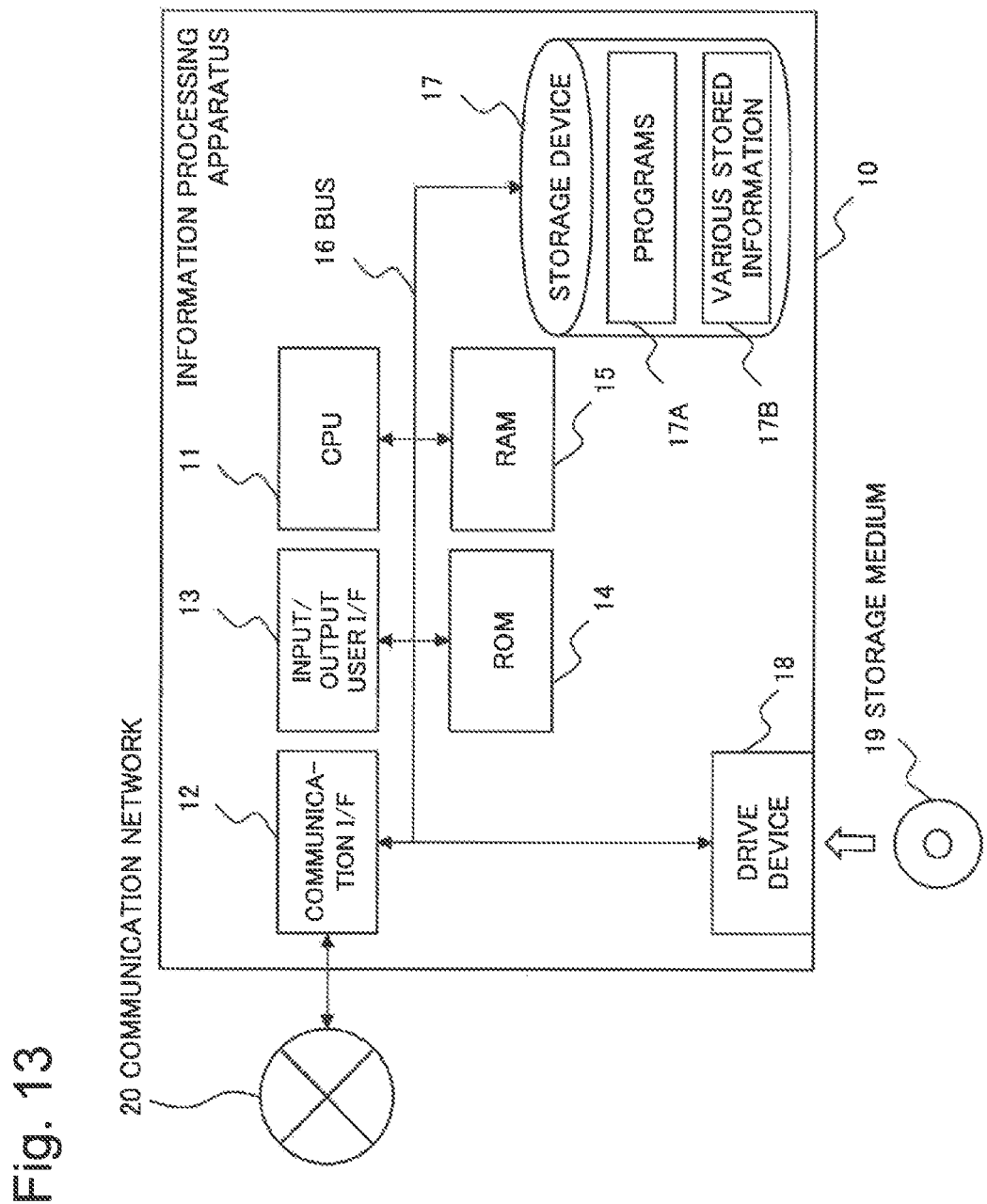

IMAGE PROCESSING APPARATUS, DISPLAY CONTROL APPARATUS, IMAGE PROCESSING METHOD AND RECORDING MEDIUM

CROSS-REFERENCE TO RELATED PATENT APPLICATIONS

This application is a continuation of U.S. patent application Ser. No. 15/521,277, filed Apr. 21, 2017, which is a National Stage Entry of International Application No. PCT/JP2015/005151, filed Oct. 9, 2015, which claims priority from Japanese Patent Application No. 2014-216117, filed Oct. 23, 2014. The entire contents of the above-referenced applications are expressly incorporated herein by reference.

TECHNICAL FIELD

The present invention relates to an image processing apparatus, a display control apparatus, an image processing method, and a recording medium.

BACKGROUND ART

It is known that sales of commodities depend on how the commodities are displayed in a store selling the commodities. Thus, there has been a demand for methods for efficiently obtaining the state of displayed commodities.

PTL 1 describes a commodity management apparatus that recognizes displayed commodities from a captured image showing the state of different types of commodities being displayed.

PTL 2 describes a method for recognizing a commodity by extracting an image of the commodity from a captured image showing commodities displayed on a commodity display shelf.

CITATION LIST

Patent Literature

PTL 1: Japanese Unexamined Patent Application Publication No. 2012-126532
PTL 2: Japanese Unexamined Patent Application Publication No. 2013-250647

SUMMARY OF INVENTION

Technical Problem

A captured image of a shelf on which commodities are displayed is under the influence of various environments, such as the position of light, the photographic angle of view, and the shielding used when the image is being captured. Suppose that, for example, for the purpose of preventing false recognition, a higher value is given to the recognition threshold, which is a border value for determining whether a recognition subject commodity is recognized as a specific product and which is a value of similarity with the specific commodity, when recognition is going to be performed on such captured image. Then, since a captured image is under the influence of environments, the image may present a lower similarity, possibly resulting in more frequent failure to recognize a commodity, i.e., a commodity in the image is not recognized as a product. On the other hand, if a lower value is given to the recognition threshold for the purpose of preventing the failure to recognize a commodity, the occurrence rate of false recognition, i.e., a commodity is recognized as another different commodity, is likely to be higher.

The techniques described in PTL 1 and PTL 2 mentioned above do not give consideration to such influence of environments. Thus, according to the techniques described in PTL 1 and PTL 2, if a recognition threshold is set so as to prevent false recognition, the failure to recognize commodity is likely to occur in a larger number of regions. Accordingly, in such cases, the techniques described in PTL 1 and PTL 2 will leave a commodity unrecognized in the region where the failure to recognize a commodity has occurred, producing a less accurate recognition result.

The present invention has been created in view of the issues described above, and an object of the invention is to provide a technique that enables higher-precision detection of a region having a high probability that the failure to recognize a commodity has occurred.

Solution to Problem

To solve the above-described issues, an image processing apparatus according to one aspect of the present invention includes: recognition means for recognizing products from a captured image obtained by capturing an image of displayed products; and detection means for detecting, based on store fixture information related to a store fixture in which the products are displayed, a region of a product that is included in the captured image but is not recognized by the recognition means.

A display control apparatus according to one aspect of the present invention displays a region where a product is not recognized but the product is possibly displayed, the region being included in a captured image obtained by capturing an image of the displayed product, on a screen as a region where the product is not recognized.

An image processing method according to one aspect of the present invention includes: recognizing products from a captured image obtained by capturing an image of displayed products; and detecting a region of a product that is included in the captured image but is not recognized based on store fixture information related to a store fixture in which the products are displayed.

A computer program implementing the individual apparatuses and the method mentioned above with a computer as well as a computer-readable storage medium storing such a computer program are also included in the scope of the present invention.

Advantageous Effects of Invention

The present invention enables higher-precision detection of a region having a high probability that the failure to recognize a commodity has occurred.

BRIEF DESCRIPTION OF DRAWINGS

FIG. 4 is a diagram for explaining a recognition result provided by the recognition unit of the image processing apparatus according to the second example embodiment.

FIG. 5 is a diagram for explaining a detection result output by a detection unit of the image processing apparatus according to the second example embodiment.

FIG. 13 is an explanatory diagram exemplifying a hardware configuration of a computer (an information processing apparatus) that can implement each individual example embodiment of the present invention.

EXAMPLE EMBODIMENT

First Example Embodiment

Figure 1:
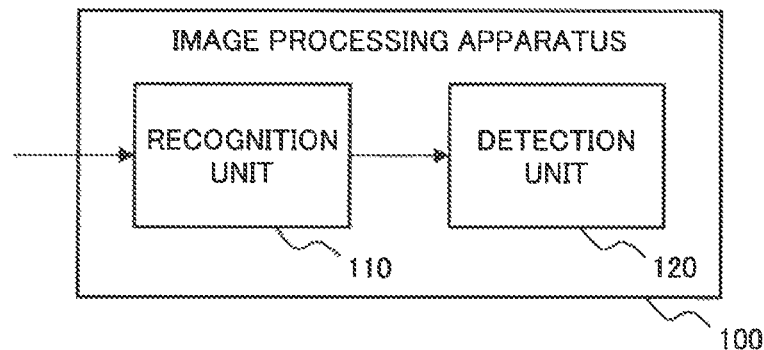
FIG. 1 is a functional block diagram illustrating an example functional configuration of an image processing apparatus according to a first example embodiment of the present invention.

A first example embodiment of the present invention will now be described with reference to the drawings. The present example embodiment describes a basic configuration for solving the issues to be solved by the present invention. FIG. 1 is a functional block diagram illustrating an example functional configuration of an image processing apparatus 100 according to the present example embodiment. As illustrated in FIG. 1, the image processing apparatus 100 according to the present example embodiment includes a recognition unit 110 and a detection unit 120. The direction indicated by an arrow in the figure represents an example only, and it does not limit the direction of a signal between blocks. Likewise, in the other block diagrams referred to below, the direction indicated by an arrow in the figures represents an example only, and it does not limit the direction of a signal between blocks.

From a captured image obtained by capturing an image of displayed products (commodities), the recognition unit 110 recognizes the products included in the captured image. The recognition method used by the recognition unit 110 is not limited to any specific method, and thus any general recognition technique may be used to recognize the products.
The recognition unit 110 outputs the captured image along with information indicating the products recognized from the captured image to the detection unit 120.

From the recognition unit 110, the detection unit 120 receives the captured image along with the information indicating the products recognized by the recognition unit 110 from the captured image. Then, the detection unit 120 detects a region of a product that is included in the received captured image but has not been recognized by the recognition unit 110, based on store fixture information regarding the store fixture in which products are displayed.

As seen above, in the image processing apparatus 100 of the present example embodiment, the detection unit 120 detects a region of a product that the recognition unit 110 has failed to recognize from the captured image. The detection unit 120 detects from the captured image the region where the product has not been recognized, based on store fixture information. This enables the image processing apparatus 100 to detect, with a higher degree of precision, the region having a high probability that the failure to recognize a product has occurred.

Second Example Embodiment

Figure 2:
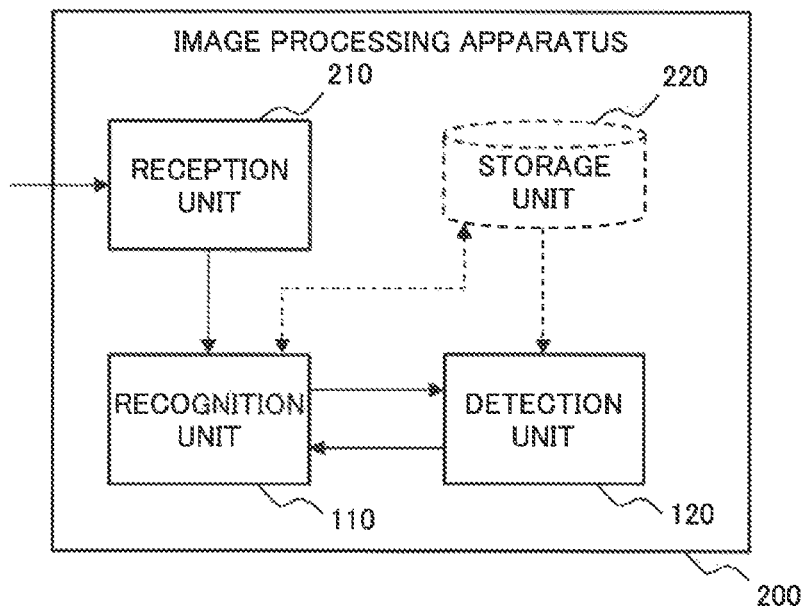
FIG. 2 is a functional block diagram illustrating an example functional configuration of an image processing apparatus according to a second example embodiment of the present invention.

A second example embodiment of the present invention, which is based on the above-described first example embodiment, will now be described with reference to the drawings. FIG. 2 is a functional block diagram illustrating an example functional configuration of an image processing apparatus 200 according to the present example embodiment. For convenience of explanation, identical reference signs are given to members having the same functions as those of the members included in the drawings described in the foregoing first example embodiment.

As illustrated in FIG. 2, the image processing apparatus 200 according to the present example embodiment includes a recognition unit 110, a detection unit 120, and a reception unit 210. The image processing apparatus 200 may be configured to further include a storage unit 220.

The reception unit 210 is a means of receiving a captured image obtained by capturing an image of a displayed product. Captured images may be, for example, images captured by an imaging apparatus, such as a non-fixed point camera.

The reception unit 210 receives such captured images from, for example, an imaging apparatus. How the reception unit 210 receives captured images is not limited to any specific method. For example, the reception unit 210 may receive captured images from an imaging apparatus connected to the image processing apparatus 200 with a USB (Universal Serial Bus) cable or the like. Alternatively, the reception unit 210 may receive captured images from an imaging apparatus connected to the image processing apparatus 200 via, for example, a network. Alternatively, the reception unit 210 may receive captured images from, for example, a storage device or the like in which captured images are accumulated. Note that the reception unit 210 receives a captured image along with positional information indicating the position at which the captured image was captured and/or the position of the imaged store fixture (such information is hereinafter called captured image information).

The reception unit 210 then supplies the received captured image along with the captured image information associated with the captured image to the recognition unit 110.

The storage unit 220 stores information for recognizing products included in a captured image. Specifically, the storage unit 220 stores a product image and/or a feature included in the product image, the product image and/or the feature being associated with the information identifying the product (for example, an identifier for identifying the product, or a product name). The storage unit 220 may store any information necessary to identify a product. The information for identifying a product is also associated with information representing the type (category) of the product.

In addition, the storage unit 220 stores store fixture information regarding the store fixture in which products are displayed. The store fixture information includes, for each of store fixtures, information about installation position representing the place where the store fixture is installed. The store fixture information further includes the following items (a) to (e), which are associated with the aforementioned information about installation position:

(a) A recognition result provided by the recognition unit 110 with respect to a captured image that was obtained by capturing an image of the store fixture at a time earlier than the capturing time when the store fixture has been captured (this recognition result is hereinafter called a previous display result);

(b) Planogram information recommended for the store fixture;

(c) The number of rows in the store fixture;

(d) The number of products that are placeable in each row in the store fixture; and (e) Information indicating conditions for display of products displayed in the store fixture.

The above-mentioned number of products that are placeable in each row in the store fixture may be rephrased as the number of slots that can contain products in each row in the store fixture.

The item (a) above is stored by the recognition unit 110 into the storage unit 220. The items (b) to (e) above are stored into the storage unit 220 in advance. The storage unit 220 may also store the size of the store fixture as the store fixture information.

The item (e) above includes information indicating, for example, the condition that a product should be placed in every slot. The item (e) may also include, for example, the condition that products of the same product name should be arranged in series, as well as the condition that products of the same type should be displayed in proximity to one another.

In addition, the storage unit 220 stores information indicating orders (or purchases) of products (hereinafter called order information) and sales information managed by a point of sale (POS) system or the like.

The information for recognizing a product, the store fixture information, the order information, and the sales information may be stored in a single storage device (e.g., the storage unit 220), or may be separately stored in different storage devices.

The storage unit 220 may be incorporated in the image processing apparatus 200, or may be implemented in a storage device separate from the image processing apparatus 200.

The recognition unit 110 receives a captured image from the reception unit 210. From the received captured image, the recognition unit 110 recognizes a product included in the captured image by referring to the information for identifying a product, as stored in the storage unit 220. As with the recognition unit 110 of the image processing apparatus 100 according to the first example embodiment, the recognition method used by the recognition unit 110 for recognizing a product is not limited to any specific method, and thus any general recognition technique may be used. The recognition unit 110 outputs to the detection unit 120 the captured image along with information (a recognition result) indicating any product that has been recognized from the captured image.

Figure 3:
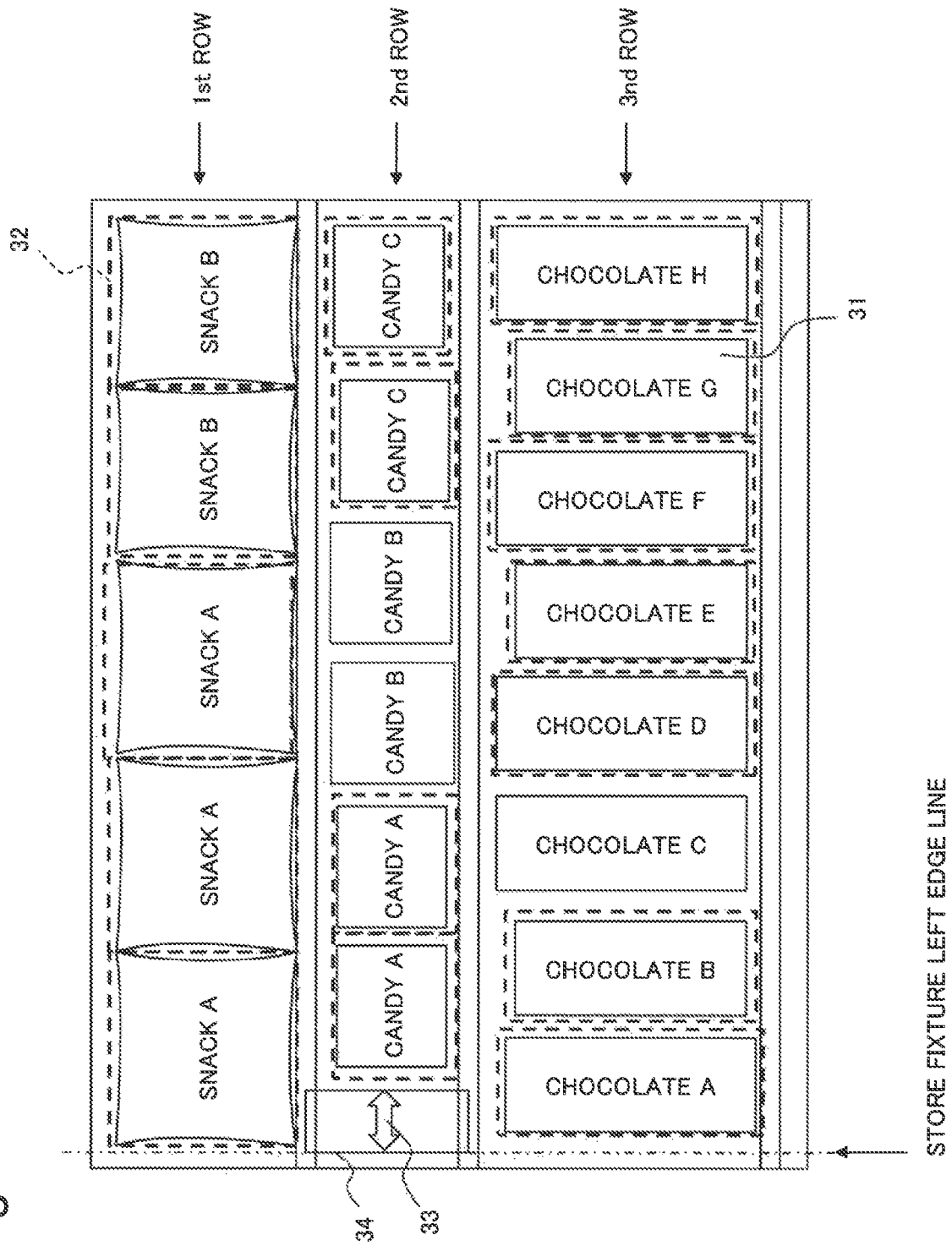
FIG. 3 is a diagram for explaining operations of a recognition unit of the image processing apparatus according to the second example embodiment.

The following further describes operations of the recognition unit 110 referring to FIGS. 3 and 4. FIG. 3 is a diagram for explaining operations of the recognition unit 110 of the image processing apparatus 200 according to the second example embodiment, showing an example captured image. FIG. 4 is a diagram for explaining a recognition result provided by the recognition unit 110.

As illustrated in FIG. 3, a captured image includes an image of a plurality of products 31. The present example embodiment assumes that a captured image is obtained by capturing an image of the whole single store fixture as illustrated in FIG. 3, but a captured image is not limited to such an image. A captured image may be obtained by capturing an image of a plurality of store fixtures. A captured image may also be obtained by capturing an image of part of a single store fixture. In FIG. 3, letters appearing in each product 31 represent a product name.

The example in FIG. 3 shows that the store fixture in which products are displayed is composed of three rows. The top row, hereinafter called a first row, displays three products named "Snack A" and two products named "Snack B". A second row displays products named "Candy A", "Candy B", and "Candy C", two products each. A third row displays products named "Chocolate A" to "Chocolate H", one product each.

In FIG. 3, a broken line frame around a product 31 (a product image region 32) represents an image region of a product 31 that has been recognized by the recognition unit 110. Thus, FIG. 3 represents that a product named "Chocolate C" and two products named "Candy B" have not been recognized by the recognition unit 110.

The recognition unit 110 outputs a recognition result, which includes information indicating a recognized product (e.g., product name), image region information indicating a product image region 32 of the product 31, and a recognition score indicating a level of certainty of the recognition result regarding the product 31, to the detection unit 120. FIG. 4 illustrates an example of recognition results. The aforementioned image region information is positional information indicating the position of the product image region 32 of the product 31, in a captured image.

As illustrated in FIG. 4, a recognition result includes, for each product, the product name indicating a recognized product, the recognition score for the product 31, and the positional information (image region information) regarding the product image region 32 of the product 31. The product name, the product score, and the image region information are associated with one another. In FIG. 4, a single line includes information about a single product 31 that has been recognized.

Suppose that the recognition unit 110 has recognized a product named "Snack A". Also suppose that coordinates of the four corners of the product's product image region 32 are (x1, y1), (x2, y2), (x3, y3), and (x4, y4), respectively, and that the recognition score is "0.80".

Then, the recognition unit 110 outputs a recognition result for "Snack A", namely "Snack A, 0.80, x1, y1, x2, y2, x3, y3, x4, y4", as illustrated in FIG. 4.

The product image region 32 is preferably a bounding rectangle formed around the product recognized by the recognition unit 110, but is not limited to such a shape. The product image region 32 may be in a shape matching the shape of a product.

A recognition result is not limited to the one described above; for example, additionally or alternatively to the product name, an identifier for identifying the product 31 may be included. That is, the recognition unit 110 may include any information indicating the recognized product 31 in a recognition result. Instead of coordinates of the four corners of a substantially rectangular product image region 32, the image region information included in a recognition result may be represented by, for example, coordinates of one of the four corners and the width and height of the product. That is, the recognition unit 110 may include in a recognition result any information indicating the product image region 32 of a product 31 that has been recognized.

The aforementioned recognition score has an upper limit of 1.0, indicating that a value closer to 1.0 represents a higher level of reliability, but this is not the only way of expressing the recognition score.

The recognition unit 110 may also include, for example, a Japanese Article Number (JAN) code or information indicating the product type (e.g., name of product type or type code) in a recognition result.

The recognition unit 110 may perform control so as to exclude, from a recognition result, information about a product whose recognition score is less than a predetermined value.

The recognition unit 110 outputs, to the detection unit 120, such a recognition result along with the captured image on which product recognition has been performed and captured image information regarding the captured image.

The recognition results illustrated in FIG. 4 are examples only, and a recognition result is not limited to the illustrated format.

The recognition unit 110 receives a detection result from the detection unit 120, and then performs recognition of a product based on such detection result. Operations for this recognition will be later described following description about operations of the detection unit 120.

The detection unit 120 receives, from the recognition unit 110, the captured image, the captured image information regarding the captured image, and the recognition result regarding the product recognized on the captured image. Then, the detection unit 120 detects a region of a product that is included in the received captured image but has not been recognized by the recognition unit 110, based on store fixture information regarding the store fixture in which products are displayed. The store fixture information referred to in this step is the information associated with the information about installation position that matches or approximates the captured image information that has been received.

Specifically, the detection unit 120 detects a region which is present in the captured image but the corresponding product of which has not been recognized. The detection unit 120 then detects, from the detected regions, a candidate for a region (hereinafter called a candidate region) in which the failure to recognize may have occurred. The candidate region is a region where a product will highly likely be placed.

For example, the detection unit 120 calculates vertical and horizontal distances between products (hereinafter called a distance between products). The detection unit 120 determines whether the calculated distance is greater than a predetermined threshold and, when the calculated distance is greater than the predetermined threshold, the detection unit 120 detects a region having the calculated distance as the candidate region.

In addition, for example, the detection unit 120 calculates the distance between the top edge of the store fixture and the top edge of the product image region 32 of a product recognized by the recognition unit 110, the product image region 32 having no other product placed on top of its product. In other words, when the top row, i.e., the first row, of the store fixture is filled with products, the detection unit 120 calculates the distance between the top edge of each of the product image regions 32 of the products in the first row and the top edge of the store fixture. When any slot in the first row has no product placed therein, the detection unit 120 calculates the distance between the product placed in a slot being directly beneath that slot in the second row (or any of the following rows) and the top edge of the store fixture. The detection unit 120 determines whether the calculated distance is greater than a predetermined threshold (first predetermined threshold) and, when the calculated distance is greater than the predetermined threshold, the detection unit 120 detects a region having the calculated distance as the candidate region.

Likewise, the detection unit 120 calculates the distance between each of the bottom edge, left edge, and right edge of the store fixture and the product and, when the calculated distance is greater than a predetermined threshold, the detection unit 120 detects a region having the calculated distance as the candidate region. Note that FIG. 3 shows a dot-and-dash line indicating the left edge of store fixture. In this way, the detection unit 120 detects the candidate region by calculating the distance between an outer edge of the store fixture and a product. The above-mentioned predetermined thresholds may be stored in the storage unit 220 as store fixture information.

With reference to FIG. 3, the detection unit 120 detects candidate regions, which include: a region (34) containing a left and right arrow (33), regions of products named "Candy B", and a region of a product named "Chocolate C".

In the captured image of the store fixture illustrated in FIG. 3, it is assumed that the number of slots in the first row is 5, the number of slots in the second row is 6, and the number of slots in the third row is 8. Information about these numbers of slots is stored in the storage unit 220 as store fixture information, as described above. Based on part of the store fixture information indicating the condition that every slot should have a product placed therein, the detection unit 120 detects any region failing to satisfy the condition as a region where the failure to recognize a product has highly likely occurred.

As described above, the third row in FIG. 3 has eight slots. The detection unit 120 has received information about seven products, as recognition results regarding the third row. This means that the third row does not satisfy the condition that every slot should have a product placed therein. Accordingly, the detection unit 120 detects that the failure to recognize a product has occurred on one product in the third row. The detection unit 120 then detects the region of a product named "Chocolate C" in the third row, out of the above-mentioned candidate regions, as a region where the failure to recognize a product has highly likely occurred.

The following describes the second row in FIG. 3. As with the regions in the third row, the detection unit 120 detects that the failure to recognize a product has occurred on two products, based on the condition that every slot should have a product placed therein. The detection unit 120 determines whether the width and/or height of the region 34 is greater than a second predetermined threshold. When the width and/or height of the region 34 is greater than the second predetermined threshold, the detection unit 120 detects the region as the one where the failure to recognize a product has highly likely occurred. In this example, the width and/or height of the region 34 is assumed to be equal to or less than the second predetermined threshold. Accordingly, the detection unit 120 determines that the region 34 is not the one where the failure to recognize a product has occurred.

The second predetermined threshold may be an average size of products displayed in the store fixture, or may be a fixed value. Such an average size or a fixed value may be set for each store fixture or may be set for each row or column of a store fixture. The second predetermined threshold may be stored in the storage unit 220 as store fixture information. The average size may be obtained from recognition results that the detection unit 120 receives from the recognition unit 110. This allows the detection unit 120 to detect a region where the failure to recognize a product has highly likely occurred, based on the size of a product placed near the product that has not been recognized.

The detection unit 120 may detect, out of candidate regions, a region where the failure to recognize a product has highly likely occurred, based on whether the quantities of feature points in an image of the candidate region is greater than a predetermined value. For example, the region 34 has no product placed therein, and thus has fewer feature points. On the other hand, the region of a product named "Candy B" has a product placed therein, and thus has more feature points than regions with no product. Based on these results, the detection unit 120 determines that the region 34 is not the one where the failure to recognize a product has highly likely occurred, while determining that the region of a product named "Candy B" is the region where the failure to recognize a product has highly likely occurred.

As seen above, the detection unit 120 detects a region of a product that has not been recognized, based on at least one of: the distance between products that have been recognized; the distance between the recognized product and an outer edge of the store fixture; the size of a recognized product: and the number of feature points included in a region where a product has not been recognized. This enables the detection unit 120 to detect, with a higher degree of precision, a region having a high probability that the failure to recognize a product has occurred.

The detection unit 120 may also detect a region where the failure to recognize a product has highly likely occurred, by using a previous display result as the store fixture information. For example, when a previous display result shows that all the products illustrated in FIG. 3 were recognized, the detection unit 120 compares the previous display result with the recognition result that has been output by the recognition unit 110. The detection unit 120 then detects a region with difference obtained through the comparison as a region where the failure to recognize a product has highly likely occurred.

The detection unit 120 may also detect a region with difference obtained by comparing the planogram information recommended for the imaged store fixture with a recognition result, as a region where the failure to recognize a product has highly likely occurred.

The detection unit 120 outputs, as a detection result, the information indicating the detected region where the failure to recognize a product has highly likely occurred to the recognition unit 110.

Although the image processing apparatus 200 according to the present example embodiment of the present invention uses a captured image showing a store fixture in which products are horizontally arranged in the individual rows as illustrated in FIG. 3, product arrangement is not limited to this. For example, the image processing apparatus 200 may use an image obtained by capturing an image of the store fixture in which products can be vertically arranged. In this case, the number of rows in the store fixture represents the number of slots that can be arranged in a column in the store fixture. Thus, a captured image obtained by capturing an image of such a store fixture also allows the detection unit 120 to detect a region where the failure to recognize a product has highly likely occurred.

In addition, the detection unit 120 preferably detects the product image region 32 of a product that has been falsely recognized. The following describes how the detection unit 120 detects a product that has been falsely recognized.

Described below is the case where conditions for display of products displayed in a store fixture, as stored in the storage unit 220 as part of the store fixture information, include the condition that products of the same product name should be arranged in series. Products of the same product name are often arranged in series in the same store fixture. Thus, the detection unit 120 determines that any recognized product that fails to satisfy this condition has been falsely recognized.

The following describes the case where conditions for display of products displayed in a store fixture, as stored in the storage unit 220 as part of the store fixture information, include the condition that products of the same type should be displayed in proximity to one another. Products of the same type are often placed in proximity to one another in the same store fixture. When this is the case, it is preferable that a recognition result includes information indicating the type of products. The detection unit 120 determines that any recognized product that fails to satisfy this condition has been falsely recognized, based on the information indicating the type of products and on the product image region information, which are included in a recognition result.

It is also preferable that the detection unit 120 determines that a product has been falsely recognized, based on order information created earlier than the time when the captured image is obtained. Specifically, the detection unit 120 compares recognized products with ordered (purchased) products and, when any recognized product was not ordered, the detection unit 120 determines that the product has been falsely recognized.

It is also preferable that the detection unit 120 determines that a product has been falsely recognized, based on sales information created earlier than the time when the captured image is obtained. Specifically, the detection unit 120 checks sales information regarding recognized products and, when any recognized product is part of the products that were totally sold, the detection unit 120 determines that the product has been falsely recognized.

The detection unit 120 may also determine that a product has been falsely recognized, based on any other store fixture information. For example, when a product included in a previous display result is significantly different from a recognized product (e.g., when the products are of different categories), the detection unit 120 may determine that the product has been falsely recognized. Likewise, when the planogram information recommended for the store fixture for which product recognition is performed is significantly inconsistent with a recognized product (e.g., when product categories are inconsistent), the detection unit 120 may determine that the product has been falsely recognized. The detection unit 120 may also determine that any product, which is included in a received recognition result, whose recognition score is smaller than a predetermined value has been falsely recognized.

The detection unit 120 then outputs, as a detection result, information indicating the product image region 32 of the product determined to have been falsely recognized to the recognition unit 110. In this way, the detection unit 120 can detect the product image region 32 of a product that has been falsely recognized.

Detection results output by the detection unit 120 are described below with reference to FIG. 5. FIG. 5 is a diagram for explaining detection results output by the detection unit 120.

It is assumed here that the detection unit 120 has detected a substantially rectangular region representing the failure to recognize a product, the region having four corners expressed by coordinates (x1, y1), (x2, y2), (x3, y3), and (x4, y4). It is further assumed that the detection unit 120 has detected a substantially rectangular region representing the product image region 32 of a product that has been falsely recognized, the region having four corners expressed by coordinates (x'1, y'1), (x'2, y'2), (x'3, y'3), and (x'4, y'4). Then, the detection unit 120 outputs, as a detection result regarding the failure to recognize a product as illustrated in FIG. 5, the detection result including the character string "Product Recognition Failure", which expresses that a product has not been recognized, and information indicating the region where the failure to recognize a product has been detected, namely "Product Recognition Failure, x1, y1, x2, y2, x3, y3, x4, y4". In addition, the detection unit 120 outputs, as a detection result regarding false recognition, the detection result including the character string "False Recognition", which expresses that a product has been falsely recognized, and information (positional information) indicating the product image region 32 of the product that has been falsely recognized, namely "False Recognition, x'1, x'2, y'2, x'3, y'3, x'4, y'4". As seen in FIG. 5, a single line includes information about a single detected region.

Regions detected by the detection unit 120 may not necessary be rectangular, but may be in any shape. The information regarding a region, as included in a detection result output by the detection unit 120, may not necessary be coordinates of four corners, but may be any information expressing a region detected by the detection unit 120. The detection results illustrated in FIG. 5 are examples only, and a detection result is not limited to the illustrated format.

The following describes how the recognition unit 110 performs, after receiving the detection result from the detection unit 120, recognition of a product based on the detection result.

Upon receipt of the detection result from the detection unit 120, the recognition unit 110 performs recognition of a product again on a captured image with respect to the region indicated in the received detection result. The recognition unit 110 performs the recognition of a product by changing the recognition parameter based on (A) to (C) below, the recognition parameter being specified before product recognition.

(A) A recognition result provided by the recognition unit 110 (the recognition result including information about a product that has already been recognized by the recognition unit 110);

(B) A previous display result; and (C) Monogram information recommended for h store fixture.

The aforementioned recognition parameter specified before product recognition may be, for example, a likelihood of a product indicated in the information used for recognition, the information being stored in the storage unit 220. With respect to the region where the failure to recognize a product has occurred, the recognition unit 110 calculates the likelihood of a product that has highly likely not been recognized, based on at least one of (A) to (C) listed above.

The following describes the case where the recognition unit 110 calculates the above-mentioned likelihood based on (A), for example. With reference to FIG. 3, for example, the row in which "Chocolate C" has not been recognized (i.e., the third row) has Chocolates A, B, and D to H displayed therein. In this case, based on the recognition result, the recognition unit 110 increases the likelihood of a product whose product name is similar to the names of products displayed in the same row that has the region where a product has not been recognized (e.g., a product having the product name "Chocolate" in this example). When the recognition result includes information indicating the type of a product, the recognition unit 110 increases the likelihood of a product of the same type as the recognized products that are placed around the region of the failure to recognize a product.

The following describes the case where the recognition unit 110 calculates the above-mentioned likelihood based on (B), for example. In this case, the recognition unit 110 increases the likelihood of a product that is included in the previous display result and is placed at and/or around the region where the failure to recognize a product has occurred. When the recognition result includes information indicating the type of a product, the recognition unit 110 increases the likelihood of a product that is included in the previous display result and is of the same type as the products placed at and/or around the region where the failure to recognize a product has occurred.

The following describes the case where the recognition unit 110 calculates the above-mentioned likelihood based on (C), for example. In this case, the recognition unit 110 increases the likelihood of a product that is included in the recommend planogram information and is placed at and/or around the region where the failure to recognize a product has occurred. When the recognition result includes information indicating the type of a product, the recognition unit 110 increases the likelihood of a product that is included in the recommended planogram information and is of the same type as the products placed at and/or around the region where the failure to recognize a product has occurred.

The recognition unit 110 may also specify the above-mentioned likelihood (recognition parameter) depending on whether the region on which product recognition is performed is the region where a product has been falsely recognized or the region where the failure to recognize a product has occurred. For example, when the region on which product recognition is performed is the product image region 32 including a product that has been falsely recognized, the recognition unit 110 decreases the likelihood of the falsely recognized product so that the product will not be recognized again as a falsely recognized product.

In this way, the recognition unit 110 can narrow down the information stored in the storage unit 220 to be used for recognition by changing the recognition parameter. As a result, the recognition unit 110 can shorten the time period for the recognition process.

Based on the calculated likelihood, the recognition unit 110 performs recognition of a product on the region indicated in a detection result. As a result, the recognition unit 110 can reduce false recognition.

Then, the recognition unit 110 outputs a recognition result to the detection unit 120. At the same time, the recognition unit 110 adds information indicating a product that has been recognized in the region where the failure to recognize a product had occurred, to the last recognition result. In addition, the recognition unit 110 removes information indicating a product that was determined to have been falsely recognized by the detection unit 120 from the last recognition result, and adds, to the last recognition result, information indicating a product that has now been recognized in the product image region 32 where a product was once determined to have been falsely recognized. As a result, the recognition unit 110 can output a new recognition result. The recognition unit 110 keeps outputting a recognition result to the detection unit 120 until the recognition unit 110 receives from the detection unit 120 a detection result representing that there is no region indicating the failure to recognize a product or false recognition.

Upon receipt of, from the detection unit 120, a detection result representing that there is no region indicating the failure to recognize a product or false recognition, the recognition unit 110 stores into the storage unit 220 the recognition result that was output to the detection unit 120 immediately before the receipt of this detection result, as a recognition result for a product on the captured image on which product recognition has been performed. The recognition result that the recognition unit 110 has just stored into the storage unit 220 acts as a previous display result seen from the recognition result for the following captured image obtained by capturing an image of the same store fixture. Thus, both the recognition unit 110 and the detection unit 120 can perform their respective processes based on the previous display result.

The recognition unit 110 may store into the storage unit 220 a recognition result generated after receiving a detection result the predetermined number of times from the detection unit 120, as a recognition result for a captured image. The recognition unit 110 may also store, when sending a recognition result to the detection unit 120, the recognition result into the storage unit 220.

Operation Flow for Image Processing Apparatus 200

Figure 6:
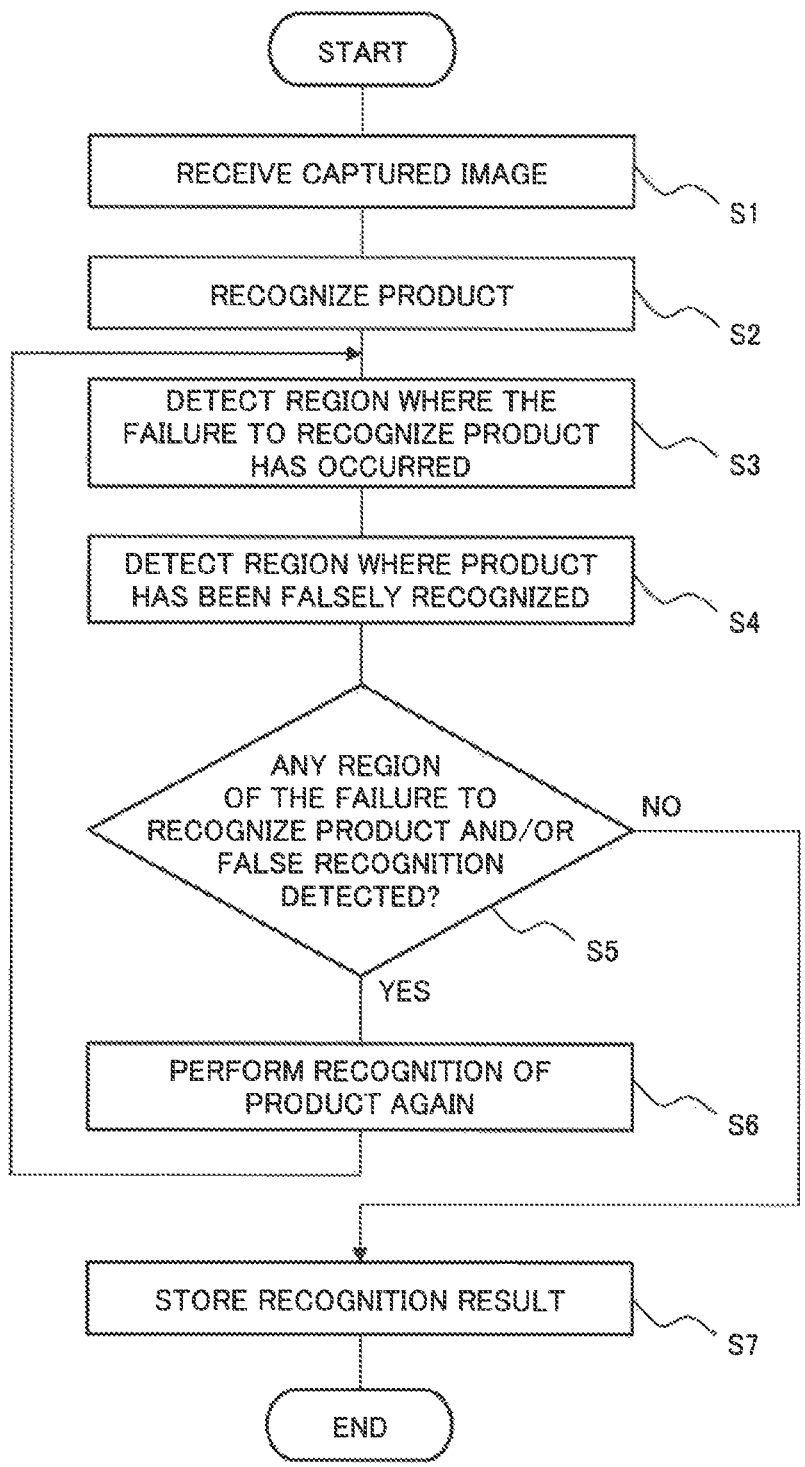
FIG. 6 is a flowchart illustrating an example operation flow for the image processing apparatus according to the second example embodiment of the present invention.

An operation flow for the image processing apparatus 200 will now be described with reference to FIG. 6. FIG. 6 is a flowchart illustrating an example operation flow for the image processing apparatus 200 according to the present example embodiment.

First, the reception unit 210 receives a captured image (Step S1). The recognition unit 110 performs recognition of a product on the captured image received by the reception unit 210 in Step S1 (Step S2).

Next, the detection unit 120 detects, based on store fixture information, a region where no product has been recognized but a product is highly likely included (i.e., a region where the failure to recognize a product has occurred) (Step S3). In addition, the detection unit 120 determines a product which has been recognized but has highly likely been falsely recognized, and detects the product image region 32 of the product (Step S4). Alternatively, Step S3 and Step S4 may be performed simultaneously or in the reverse order.

Then, the recognition unit 110 confirms whether any region of the failure to recognize a product and/or false recognition has been detected. Specifically, the recognition unit 110 confirms whether the detection result received from the detection unit 120 indicates any region of the failure to recognize a product and/or false recognition or not (Step S5). When the detection result indicates any region of the failure to recognize a product and/or false recognition (YES in Step S5), the recognition unit 110 performs recognition of a product again on the region indicated in the detection result provided by the detection unit 120 (Step S6). Next, the detection unit 120 performs Step S3 again to detect any region of the failure to recognize a product.

When the detection result indicates no region of the failure to recognize a product and/or false recognition (NO in Step S5), the recognition unit 110 stores the recognition result into the storage unit 220 and exits from the process (Step S7).

Effects

The image processing apparatus 200 according to the present example embodiment enables higher-precision detection of a region having a high probability that the failure to recognize a product has occurred. This is because the detection unit 120 detects a region of the product that the recognition unit 110 has failed to recognize from a captured image, based on store fixture information.

In general, in a recognition process, a recognition threshold is set and a recognition result is output based on the recognition threshold. However, a lower recognition threshold set by the recognition unit 110 will lead to a higher rate of occurrence of false recognition. Thus, the recognition unit 110 according to the present example embodiment sets a recognition threshold so as to lower the rate of occurrence of false recognition more effectively. However, in general, if a higher recognition threshold is set, it is highly likely that the failure to recognize a product will occur in more regions. The image processing apparatus 200 according to the present example embodiment enables the detection unit 120 to detect such regions where the failure to recognize a product has occurred, based on store fixture information.

Hence, the recognition unit 110 can perform recognition of a product again by changing the recognition parameter, only on such detected regions where the failure to recognize a product has occurred. This can further prevent the failure to recognize a product and false recognition.

Therefore, the image processing apparatus 200 according to the present example embodiment can obtain higher-precision information indicating planogram from a captured image.

Third Example Embodiment

Figure 7:
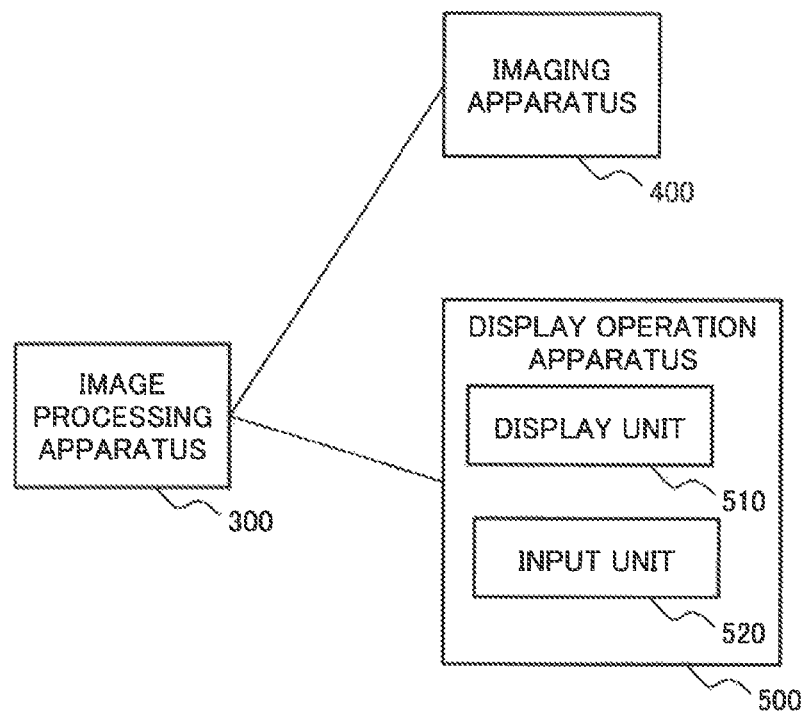
FIG. 7 is a diagram illustrating an example configuration of a system including an image processing apparatus according to a third example embodiment of the present invention.

A third example embodiment of the present invention will now be described. As with the second example embodiment, the third example embodiment is based on the above-described first example embodiment. FIG. 7 is a functional block diagram illustrating an example functional configuration of an image processing apparatus 300 according to the present example embodiment. For convenience of explanation, identical reference signs are given to members having the same functions as those of the members included in the drawings described in the foregoing first and second example embodiments, and descriptions of these members are omitted. The image processing apparatus 300 of the present example embodiment further includes a display control unit and a modification unit, in addition to the image processing apparatus 200 of the above-described second example embodiment.

To begin with, an example configuration of a system that includes the image processing apparatus 300 of the present example embodiment is described below with reference to FIG. 7. FIG. 7 is a diagram illustrating an example configuration of a system including the image processing apparatus 300 according to the present example embodiment. As illustrated in FIG. 7, the system includes the image processing apparatus 300, an imaging apparatus 400, and a display operation apparatus 500.

The image processing apparatus 300 is communicatively connected to the imaging apparatus 400. The imaging apparatus 400 captures images of displayed products. The imaging apparatus 400 then sends the image that it has captured (captured image) to the image processing apparatus 300. The imaging apparatus 400 is implemented by, for example, a non-fixed point camera.

The display operation apparatus 500 is communicatively connected to the image processing apparatus 300. The display operation apparatus 500 may be connected to the image processing apparatus 300 over a network, or may be directly connected to the image processing apparatus 300. As illustrated in FIG. 7, the display operation apparatus 500 includes a display unit 510 and an input unit 520.

Although the present example embodiment is described with the assumption that the display operation apparatus 500 and the image processing apparatus 300 are configured to be separate from each other, the display operation apparatus 500 may be formed to be integrated into the image processing apparatus 300.

The display operation apparatus 500 may be, for example, a touch panel into which the display unit 510 and the input unit 520 are integrated. The display unit 510 is a display device displaying, based on a signal sent from the image processing apparatus 300, a graphical user interface (GUI) or the like on the screen to allow the user to perform operations The input unit 520 is a device that detects an instruction given by the user. The input unit 520 detects the position coordinates on the screen) of an instruction given on the screen. In the case that the display operation apparatus 500 is, for example, a touch panel, the input unit 520 detects an input operation performed by an object on/near the screen. The input unit 520 also detects an input operation performed by the user by, for example, operating a mouse or the like. The input unit 520 sends a detection result, as an input operation signal, to the image processing apparatus 300.

Figure 8:
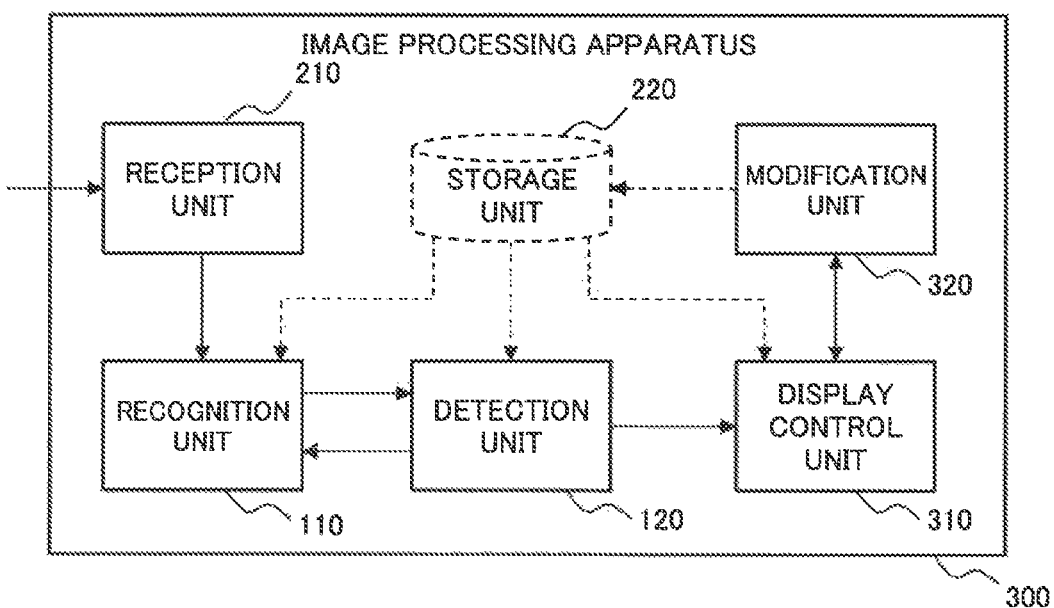
FIG. 8 is a functional block diagram illustrating an example functional configuration of the image processing apparatus according to the third example embodiment of the present invention.

The following describes the image processing apparatus 300 referring to FIG. 8. FIG. 8 is a functional block diagram illustrating an example functional configuration of the image processing apparatus 300 according to the present example embodiment. As illustrated in FIG. 8, the image processing apparatus 300 includes a recognition unit 110, a detection unit 120, a reception unit 210, a display control unit 310, and a modification unit 320. The image processing apparatus 300 may be configured to further include a storage unit 220.

The reception unit 210 receives a captured image sent from the imaging apparatus 400 and outputs the image to the recognition unit 110.

In addition to the information stored in the storage unit 220 of the second example embodiment, the storage unit 220 stores product images to be displayed on the display unit 510, the product images being associated with information for identifying products. Product images to be displayed on the display unit 510 may be the exact product images stored as information necessary for recognizing products, or may be thumbnail images representing products.

As with the recognition unit 110 of the second example embodiment, the recognition unit 110 recognizes, from a captured image that has been received, a product included in the captured image. Then, the recognition unit 110 outputs a recognition result to the detection unit 120.

Upon receipt of a detection result from the detection unit 120, the recognition unit 110 changes the recognition parameter based on the detection result, and performs recognition of a product again on the region indicated in the detection result. Then, the recognition unit 110 outputs a recognition result to the detection unit 120.

As with the detection unit 120 of the second example embodiment, the detection unit 120 detects a region where the failure to recognize a product has highly likely occurred. As with the detection unit 120 of the second example embodiment, the detection unit 120 may further include a function to detect the product image region 32 of a product that has been falsely recognized.

In addition, the detection unit 120 confirms whether the detection unit 120 has received a recognition result from the recognition unit 110 the predetermined number of times. When the detection unit 120 has received a recognition result the predetermined number of times, the detection unit 120 outputs a detection result along with the received recognition result to the display control unit 310.

For example, in the case that the predetermined number of times is one, after receiving a first recognition result, the detection unit 120 detects a region of the failure to recognize a product or false recognition, and then outputs a detection result along with the received recognition result and the captured image on which product recognition has been performed to the display control unit 310.

The display control unit 310 receives the detection result along with the recognition result and the captured image from the detection unit 120. Then, the display control unit 310 displays information representing the region indicated in the detection result on the display unit 510. For example, the display control unit 310 either generates an image representing the region indicated in the detection result by using the received captured image or extracts an image representing the region from the captured image, and displays the generated or extracted image on the display unit 510.

In addition, the display control unit 310 determines a candidate for a product (hereinafter called a modification candidate), which may be present in the aforementioned region, based on at least any one of (1) to (3) below.

(1) A previous display result;
(2) Planogram information recommended for the store fixture; and
(3) A product that has already been recognized by the recognition unit 110 (the received recognition result).

For example, the display control unit 310 identifies, from the received recognition result, a product placed in a region around the region indicated in the detection result. The display control unit 310 determines a product placed in the surrounding region to be a modification candidate.

Next, the display control unit 310 obtains, from the storage unit 220, a product image showing the product corresponding to the determined modification candidate. The display control unit 310 then display the obtained product image selectable by the user on the display unit 510.

The display control unit 310 may also calculate a matching rate (a level of similarity) between products based on the received recognition result and determine a modification candidate based on the matching rate. For example, the display control unit 310 may calculate a matching rate between types of products displayed in the row that includes the region indicated in the detection result, and determine a product of the type having a higher rate of matching to be a modification candidate. In this case, the determined modification candidate may be a product included in the recognition result, or may be a product that is not included in the recognition result but its information is stored in the storage unit 220.

The display control unit 310 may also determine a likelihood of the product to be displayed by the display unit 510 as a modification candidate, based on a recognition result and at least one of: information indicating conditions for display of products displayed in the store fixture, order information, and sales information. The display control unit 310 may then determine a modification candidate based on the determined likelihood.

The foregoing information representing conditions for display of products displayed in the store fixture include, for example, the condition that products of the same product name should be arranged in series and the condition that product; of the same type should be displayed in proximity to one another.

In this way, the display control unit 310 can narrow down modification candidates to be displayed on the display unit 510.

It is preferable that the display control unit 310 displays modification candidates on the display unit 510, in descending order of possibility of being present in the aforementioned region. This allows the image processing apparatus 300 to present to the user, from among modification candidates, the products that are highly likely present in the aforementioned region in an easier-to-understand way.

The display control unit 310 may determine the descending order of possibility of being present in the region, based on the product name and/or product type of a product placed at a distance closer to the region.

Alternatively, the display control unit 310 may determine the descending order of possibility of being present in the region, based on the recognition score included in a recognition result for the product corresponding to the region. Then, the display control unit 310 instructs the recognition unit 110 to perform recognition of a product again on the region, and receives a recognition result for a product corresponding to the region. It is preferable that the recognition result includes a plurality of products having high possibilities of being present in the region along with their recognition scores. Then, the display control unit 310 determines the descending order of recognition scores of the plurality of products included in the recognition result to be the descending order of possibility of being present in the region.

Next, the display control unit 310 displays the determined modification candidates selectable by the user on the display unit 510. No specific limit is imposed on the number of modification candidates that the display control unit 310 display on the display unit 510.

When the modification candidates displayed by the display unit 510 do not include any product desired by the user, the display control unit 310 may display a product image selectable by the user on the display unit 510, the product image being stored in the storage unit 220. When the storage unit 220 does not store any product image desired by the user, the display unit 510 may register a product image to the storage unit 220 based on a user instruction sent from the input unit 520.

The display control unit 310 supplies information indicating the image displayed on the display unit 510 along with the received recognition result to the modification unit 320.

The modification unit 320 receives an input operation signal indicating the input operation detected by the input unit 520. In addition, the modification unit 320 receives, from the display control unit 310, the information indicating the image that the display control unit 310 displays on the display unit 510 along with the recognition result. Then, the modification unit 320 modifies the recognition result based on the result of selection made on a product candidate displayed on the display unit 510, as indicated by the received input operation signal.

In the case that the display control unit 310 displays a modification candidate for a region of the failure to recognize a product on the display unit 510, the modification unit 320 adds information regarding the modification candidate selected by the user to the recognition result. In the case that the display control unit 310 displays a modification candidate for a region of a falsely recognized product on the display unit 510, the modification unit 320 deletes the information regarding the product determined by the detection unit 120 to be falsely recognized from the recognition result. The modification unit 320 then adds information regarding the modification candidate selected by the user to the recognition result. As a result, the recognition unit 110 can output a new recognition result (a modified recognition result).

The modification unit 320 stores the modified recognition result into the storage unit 220 as a result of recognition of a product on the captured image where product recognition has been performed. The recognition result that the modification unit 320 has just stored into the storage unit 220 acts as a previous display result seen from the recognition result for the following captured image obtained by capturing an image of the same store fixture. Accordingly, the recognition unit 110, the detection unit 120, and the display control unit 310 can perform their respective processes based on the previous display result.

Figure 9:
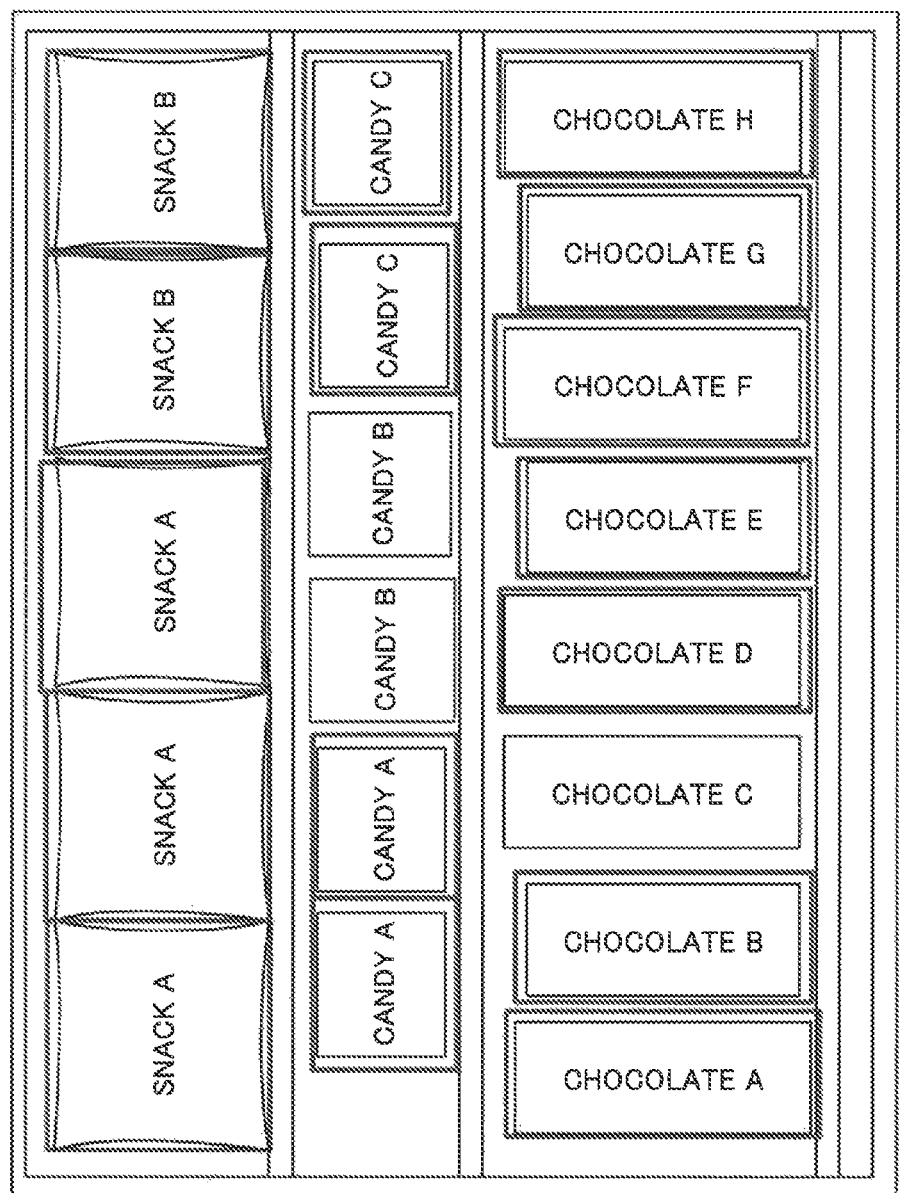
FIG. 9 is a diagram illustrating an example of an image displayed on a display unit by a display control unit of the image processing apparatus according to the third example embodiment of the present invention.
Figure 10:
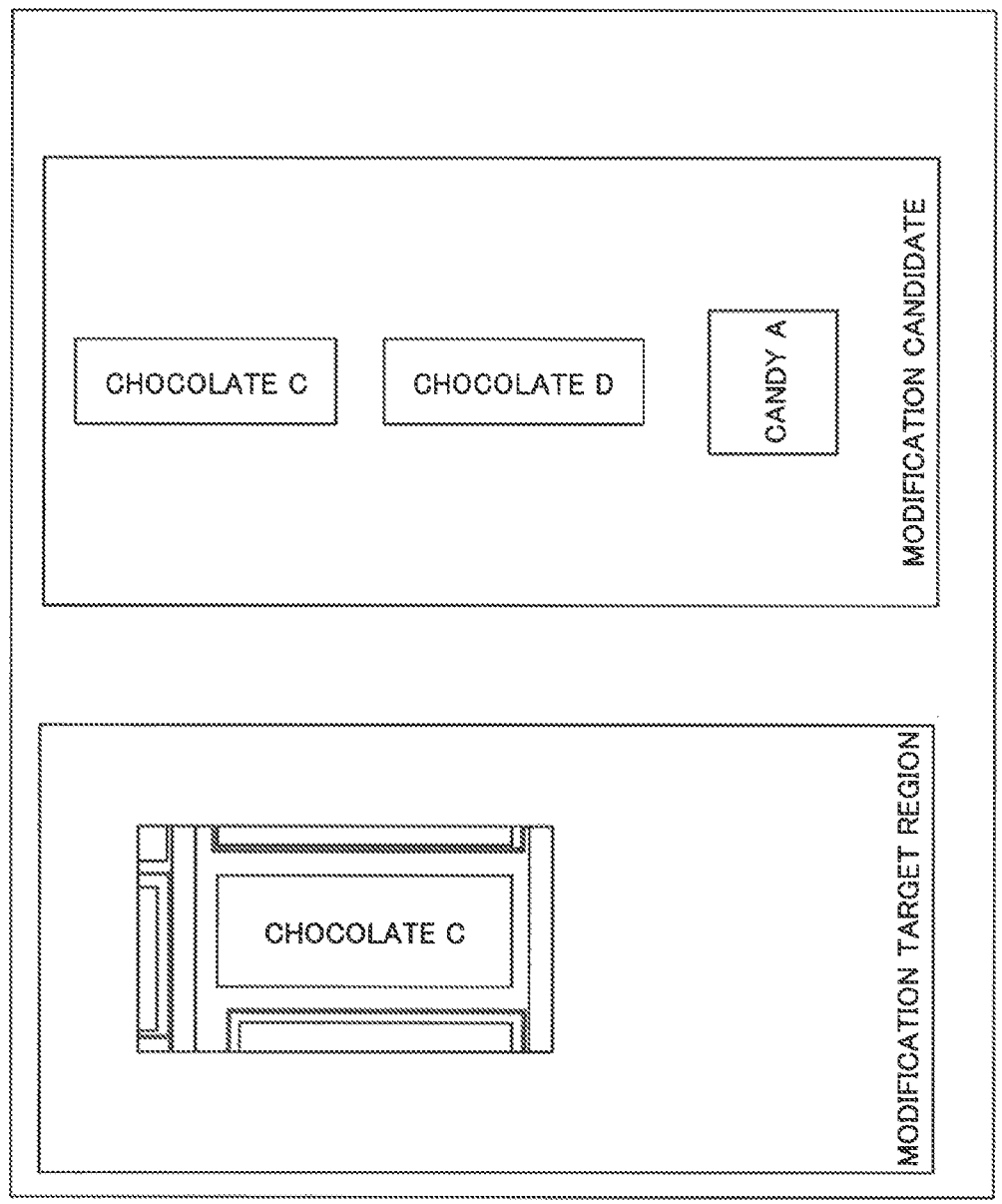
FIG. 10 is a diagram illustrating another example of an image displayed on the display unit by the display control unit of the image processing apparatus according to the third example embodiment of the present invention.
Figure 11:
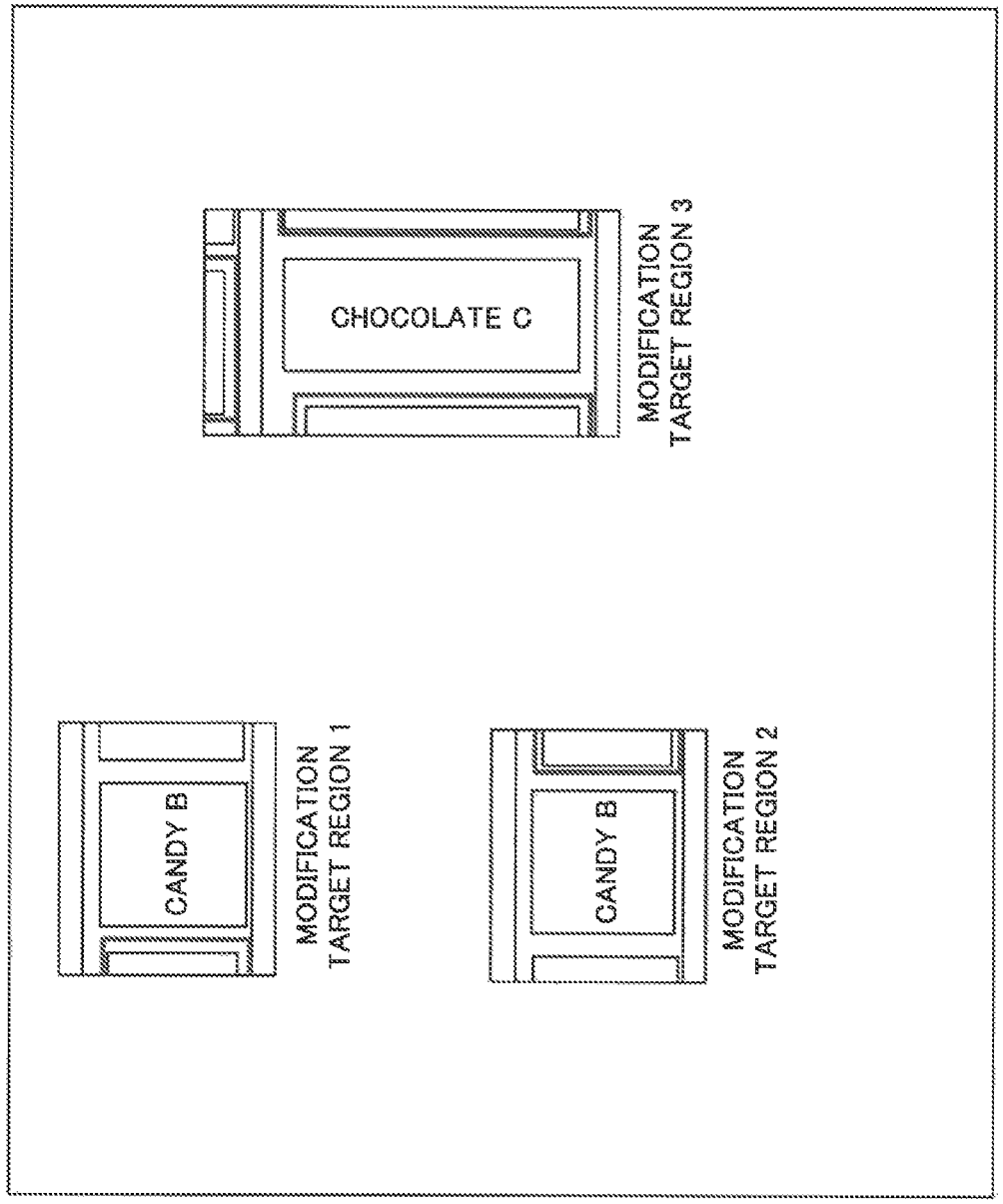
FIG. 11 is a diagram illustrating still another example of an image displayed on the display unit by the display control unit of the image processing apparatus according to the third example embodiment of the present invention.

FIGS. 9 to 11 each is a diagram illustrating an example of an image displayed on the display unit 510 by the display control unit 310 of the image processing apparatus 300 according to the present example embodiment of the present invention. As illustrated in FIG. 9, the display control unit 310 displays information indicating a region of the failure to recognize a product and/or false recognition included in a captured image on the display unit 510. In FIG. 9, a region of the failure to recognize a product and/or false recognition is shown by the display control unit 310 without a substantially rectangular thick frame (the aforementioned product image region 32).

When the user selects (e.g., taps) any region of the failure to recognize a product and/or false recognition, the input unit 520 sends the information indicating the position selected by the user, as an input operation signal, to the image processing apparatus 300. The modification unit 320 identifies the selected region based on the input operation signal sent from the input unit 520, and then sends the information indicating the region to the display control unit 310. Based on the information received from the modification unit 320, the display control unit 310 displays an image of the region of the failure to recognize a product and/or false recognition, which has been selected by the user on the display unit 510. For example, in the case that the user has selected an area of "Chocolate C" illustrated in FIG. 9, the display control unit 310 displays an image of an area showing "Chocolate C" on the display unit 510, as illustrated on the left side of FIG. 10. The left hand of FIG. 10 shows a region to be modified, which may be hereinafter called a modification target region.

Next, the display control unit 310 displays modification candidates for the modification target region on the display unit 510 so as to be selectable, as illustrated on the right side of FIG. 10.

When the user selects any of the modification candidates displayed on the screen, the modification unit 320 modifies the recognition result based on the selection result.

Instead of the screen display illustrated in FIG. 9, the display control unit 310 may displays images consisting only of regions of the failure to recognize a product and/or false recognition on the display unit 510 as illustrated in FIG. 11.

The display control unit 310 may also display either the screens in FIGS. 9 and 10 or the screens in FIGS. 11 and 10 on a single screen.

Operation How for Image Processing Apparatus
300

Figure 12:
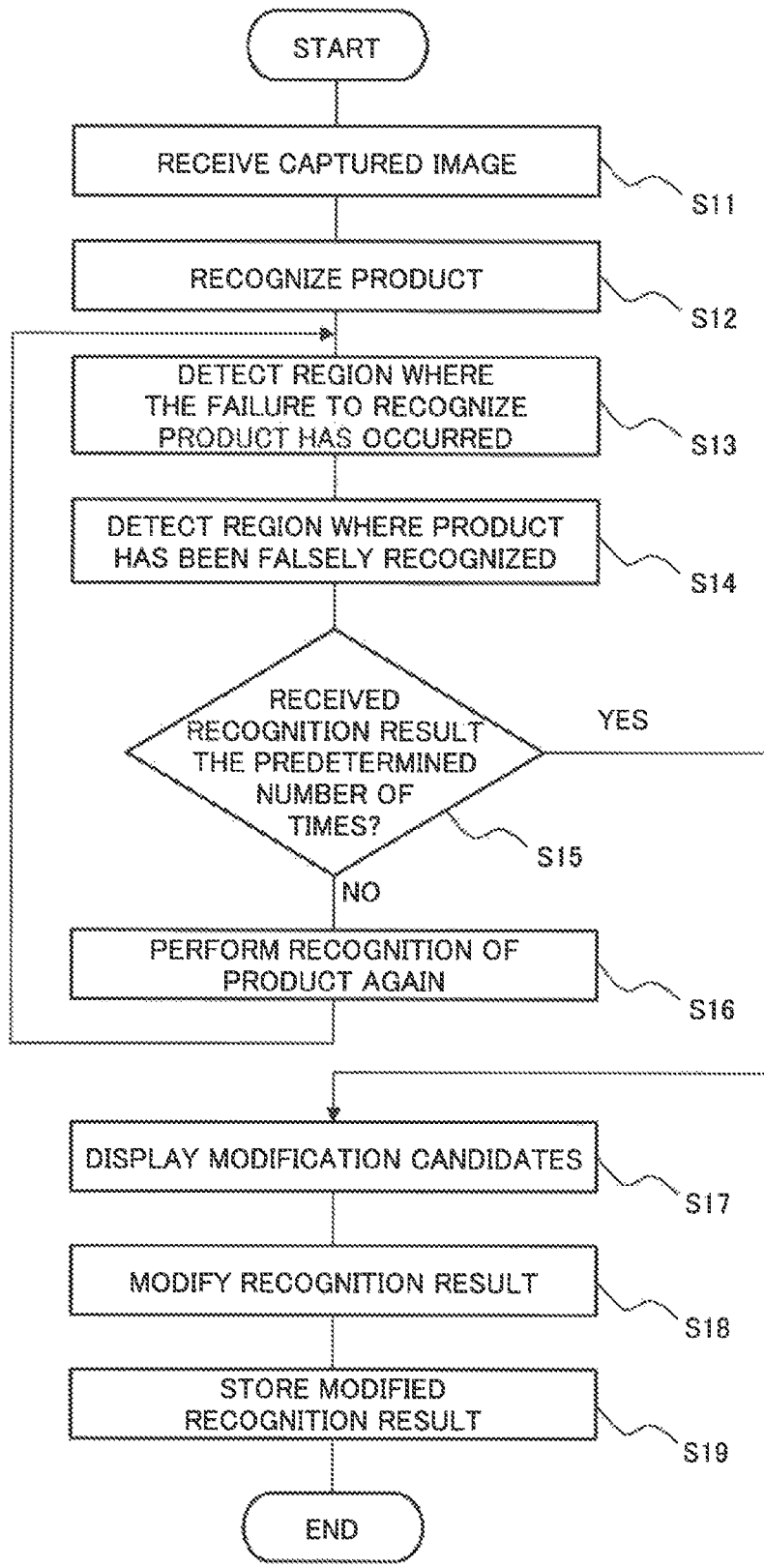
FIG. 12 is a flowchart illustrating an example operation flow for the image processing apparatus according to the third example embodiment of the present invention.

An operation flow for the image processing apparatus 300 will now be described with reference to FIG. 12. FIG. 12 is a flowchart illustrating an example operation flow for the image processing apparatus 300 according to the present example embodiment.

The processes from Steps S11 to S14 are the same as those from Steps S1 to S4 for the operation of the image processing apparatus 200 according to the second example embodiment, and thus their descriptions are omitted.

Upon completion of Step S14, the detection unit 120 confirms whether the detection unit 120 has received a recognition result from the recognition unit 110 the predetermined number of times (Step S15). In the case that the detection unit 120 has not received a recognition result the predetermined number of times (NO in Step S15), the recognition unit 110 performs recognition of a product again on the region indicated in the detection result provided by the detection unit 120 (Step S16). Next, the detection unit 120 performs Step S3 again to detect any region of the failure to recognize a product.

When a recognition result has been received the predetermined number of times (YES in Step S15), the display control unit 310 controls the display unit 510 so that modification candidates are displayed on the screen. The display unit 510 displays modification candidates on the screen (Step S17).

When the user selects any of the modification candidates displayed on the screen, the modification unit 320 modifies the recognition result based on the selection result (Step S18). The modification unit 320 stores the recognition result into the storage unit 220 and exits from t process (Step S19).

Effects

The image processing apparatus 300 of the present example embodiment provides effects similar to those provided by the image processing apparatuses of the above-described first and second example embodiments.

In the case where the operator (user) is to modify a recognition result, the user would face more burdensome modification works in order to recognize a larger number of product masters. The image processing apparatus 300 of the present example embodiment, however, allows the display control unit 310 to display candidates of a product that may be present in the region detected by the detection unit 120 on the screen selectably. Thus, the image processing apparatus 300 of the present example embodiment can reduce the burdens imposed on the user for modification works. As a result, the image processing apparatus 300 can obtain higher-precision information indicating planogram from a captured image without increasing a burden on the user.

Although the present example embodiment described above assumes that the display control unit 310 is incorporated in the image processing apparatus 300, the display control unit 310 may be implemented as a display control apparatus separate from the image processing apparatus 300. The display control apparatus displays a region where a product has not been recognized but the product may be displayed therein, the region being part of a captured image obtained by capturing an image of displayed products, on the screen of the display unit 510, as a region where a product has not been recognized. As a result, the display control apparatus can present a region having a high probability that the failure to recognize a product has occurred to the user.

Example of Hardware Configuration

An example hardware configuration that can implement any of the image processing apparatuses (100, 200, and 300) according to the above-described example embodiments will now be described. The above-described image processing apparatuses (100, 200, and 300) each may be implemented in the form of a dedicated apparatus, or may be implemented with a computer (an information processing apparatus).

FIG. 13 is a diagram illustrating a hardware configuration of a computer (an information processing apparatus) that can implement the individual example embodiments of the present invention.

The hardware of the information processing apparatus (computer) 10 illustrated in FIG. 13 includes the following members:

A CPU (central processing unit) 11;
A communication interface (I/F) 12; an input/output user interface 13;
ROM (read only memory) 14;
RAM (random access memory) 15;
A storage device 17; and
A drive device 18 for a computer-readable recording medium 19.

These members are connected to one another via a bus 16. The input/output user interface 13 is a man-machine interface for an input device, e.g., a keyboard, and an output device, e.g., a display. The communication interface 12 is a general communication means allowing each of the apparatuses according to the above-described example embodiments (FIGS. 1, 2, and 8) to communicate with an external device via a communication network 20. In such a hardware configuration, the CPU 11 is responsible for the overall operations of the information processing apparatus 10, which implements any of the image processing apparatuses (100, 200, and 300) according to the respective example embodiments.

Each of the above-described example embodiments is implemented by, for example, supplying a program (computer program) that can implement the processing described in the above-described respective example embodiments to the information processing apparatus 10 illustrated in FIG. 13, and then loading the program into the CPU 11 and executing it. Such a program may be programs that can implement, for example, the various processes described in the flowcharts (FIGS. 6 and 12), with reference to which the above example embodiments have been respectively described, or the individual units (blocks) included in the apparatus in the block diagram illustrated in each of FIGS. 1, 2, and 8.

The programs supplied into the information processing apparatus 10 may be stored in a readable and writable transitory storage memory (15) or in a non-volatile storage device (17) such as a hard disk drive. That is, programs 17A in the storage device 17 can implement, for example, functions of the individual units illustrated in each of the image processing apparatuses (100, 200, and 300) according to the above-described example embodiments. Various stored information 17B may include, for example, captured images, information for recognizing products, recognition results, detection results, store fixture information, sales information, order information, and product images in the above-described respective example embodiments. Note that, when implementing the programs on the information processing apparatus 10, component units of each individual program module may not necessarily correspond to segments of the individual blocks illustrated in the block diagrams (FIGS. 1, 2, and 8) but may be selected as appropriate by those skilled in the art before the implementation.

In addition, in the cases described above, procedures widely available as of now as listed below can be used to provide the programs to the apparatus:

Installing the programs into the apparatus via any of various computer-readable recording media (19), such as a CD (Compact Disk)-ROM or flash memory device; and Downloading the programs from an external source via a communication line (20) such as the Internet.

In such cases, each of the example embodiments of the present invention can be seen as being composed of codes constituting such computer programs (the programs 17A) or being composed of the recording medium (19) storing such codes.

The present invention has been described as examples in which the present invention is applied to the above-described exemplary embodiments and their examples. However, the technical scope of the present invention is not limited to the scope described in the foregoing respective example embodiments and examples. It is obvious to those skilled in the art that various modifications and improvements can be added to such example embodiments. If this is the case, any new example embodiment incorporating such modification or improvement may be included in the technical scope of the present invention. This is obvious from the statements in the appended claims.

The present application claims priority based on Japanese Patent Application No. 2014-216117 filed on Oct. 23, 2014, the entire disclosure of which is incorporated herein.

REFERENCE SIGNS LIST

100 Image processing apparatus
110 Recognition unit
120 Detection unit
200 Image processing apparatus
210 Reception unit
220 Storage unit
300 Image processing apparatus
310 Display control unit (display control apparatus)
320 Modification unit
400 Imaging apparatus
500 Display operation apparatus
510 Display unit
520 Input unit
31 Product
32 Product image region

The invention claimed is:

1. An image processing apparatus comprising:
a memory for storing instructions; and
a processor coupled to the memory and configured to execute the instructions to:
perform a recognition of products from a first captured image obtained by capturing an image of displayed products;
detect a likely region in which a product is likely to be present, among presence unrecognized regions where recognition of a presence of the products has failed by the recognition from the first captured image, based on at least one of:
a distance between the products that have been recognized being larger than a predetermined threshold;
a distance between at least one of the recognized products and an outer edge of the store fixture being larger than a predetermined threshold;
a difference in a size of the presence unrecognized regions and an average size of at least one of the recognized products being larger than a predetermined threshold;
a number of feature points included in the presence unrecognized regions being greater than a predetermined value; or
difference obtained by comparing planogram information recommended for the displayed products with a result of the recognition of products;
output, based on the detection, at least one of information associated with an unrecognized product present in the likely region detected or information associated with the likely region detected; and
display a candidate product that has a possibility of being present in the likely region detected on the screen, the candidate product being selectable.

2. The image processing apparatus according to claim 1, wherein the processor is further configured to execute the instructions to:
display the information associated with the likely region detected.

3. The image processing apparatus according to claim 1, wherein the processor is further configured to execute the instructions to:
modify a result of the recognition based on a result of selection for the candidate product displayed on the screen.

4. The image processing apparatus according to claim 1, wherein a recognition parameter is adjusted based on at least one of the information associated with the unrecognized product or the information associated with the likely region detected.

5. An image processing method comprising:
performing a recognition of products from a first captured image obtained by capturing an image of displayed products;
detecting a likely region in which a product is likely to be present, among presence unrecognized regions where presence of the products were not recognized by the recognition from the first captured image, based on at least one of:
a distance between the products that have been recognized being larger than a predetermined threshold;
a distance between at least one of the recognized products and an outer edge of the store fixture being larger than a predetermined threshold;
a difference in a size of the presence unrecognized regions and an average size of at least one of the recognized products being larger than a predetermined threshold;
a number of feature points included in the presence unrecognized regions being greater than a predetermined value; or difference obtained by comparing planogram information recommended for the displayed products with a result of the recognition of products; and outputting, based on the detection, at least one of information associated with an unrecognized product present in the likely region detected or information associated with the likely region detected, wherein a recognition parameter is adjusted based on at least one of the information associated with the unrecognized product or the information associated with the likely region detected.

6. The image processing method according to claim 5, further comprising displaying a candidate product that has a possibility of being present in the likely region detected on the screen, the candidate product being selectable.

7. The image processing method according to claim 6, further comprising modifying a result of the recognition based on a result of selection for the candidate product displayed on the screen.

8. A non-transitory computer readable medium storing a program that causes a computer to execute processes of:

performing a recognition of products from a first captured image obtained by capturing an image of displayed products;

detecting a likely region in which a product is likely to be present, among presence unrecognized regions where presence of a product was not recognized by the recognition from the first captured image based on at least one of:

a distance between the products that have been recognized being larger than a predetermined threshold;

a distance between at least one of the recognized products and an outer edge of the store fixture being larger than a predetermined threshold;

a difference in a size of the presence unrecognized regions and an average size of at least one of the recognized products being larger than a predetermined threshold;

a number of feature points included in the presence unrecognized regions being greater than a predetermined value; or difference obtained by comparing planogram information recommended for the displayed products with a result of the recognition of products; and outputting, based on the detection, at least one of information associated with an unrecognized product present in the likely region detected or information associated with the likely region detected, wherein a recognition parameter is adjusted based on at least one of the information associated with the unrecognized product or the information associated with the likely region detected.

9. The non-transitory computer readable medium according to claim 8, wherein the program causes the computer to further execute a process of displaying a candidate product that has a possibility of being present in the likely region detected on the screen, the candidate product being selectable.

10. The non-transitory computer readable medium according to claim 9, wherein the program causes the computer to further execute a process of modifying a result of the recognition based on a result of selection for the candidate product displayed on the screen.

* * * * *